(12) United States Patent
Augst

(10) Patent No.: US 9,552,730 B2
(45) Date of Patent: Jan. 24, 2017

(54) METHOD FOR THE COMPUTER-ASSISTED PROCESSING OF THE VICINITY OF A VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 375 days.

(21) Appl. No.: 14/224,254

(22) Filed: Mar. 25, 2014

(65) Prior Publication Data

US 2014/0203925 A1    Jul. 24, 2014

Related U.S. Application Data

(63) Continuation of application No. PCT/EP2012/068723, filed on Sep. 24, 2012.

(30) Foreign Application Priority Data

Sep. 29, 2011    (DE) .................. 10 2011 083 770

(51) Int. Cl.
*G08G 1/16* (2006.01)
*B60Q 9/00* (2006.01)

(52) U.S. Cl.
CPC ............... *G08G 1/16* (2013.01); *B60Q 9/006* (2013.01); *B60Q 9/007* (2013.01); *G08G 1/168* (2013.01);
(Continued)

(58) Field of Classification Search
CPC ............. G08B 1/16; B08Q 1/00; B60Q 9/006; B60Q 9/007; B60Q 1/00; G08G 1/168; G08G 1/166; B60K 2350/352; B60K 2350/1084
(Continued)

(56) References Cited

U.S. PATENT DOCUMENTS

2005/0085984 A1* 4/2005 Uhler ................. B60K 31/0008
701/70
2006/0187009 A1* 8/2006 Kropinski ............. B60Q 5/006
340/435
(Continued)

FOREIGN PATENT DOCUMENTS

DE    100 39 795 C2    3/2002
DE    102 21 339 A1    11/2003
(Continued)

OTHER PUBLICATIONS

International Preliminary Report on Patentability (PCT/IB/373) dated Apr. 1, 2014 (One (1) page).
(Continued)

*Primary Examiner* — Hung T Nguyen
(74) *Attorney, Agent, or Firm* — Crowell & Moring LLP

(57) ABSTRACT

A method for computer-supported processing of the vicinity of a vehicle includes detecting the surroundings of a vehicle and providing surroundings data by a sensor system. The surroundings data may be processed to ascertain, for pre-specified sections of the surroundings of the vehicle, a specific distance to objects detected by the sensor system. A collision probability between one of the detected objects and the vehicle is ascertained depending on a predicted and/or actual vehicle movement determined using odometric data. Moreover, the surroundings of the vehicle are depicted on an output unit where, for at least one of the pre-specified sections, distance information between such at least one pre-specified section of the surroundings and the detected object is output using at least one of a graphic element and an acoustic element that includes collision information about a collision probability.

18 Claims, 4 Drawing Sheets

(52) U.S. Cl.
CPC .. *B60K 2350/1084* (2013.01); *B60K 2350/352* (2013.01); *G08G 1/165* (2013.01); *G08G 1/166* (2013.01); *Y02T 10/84* (2013.01)

(58) Field of Classification Search
USPC ......... 340/435, 436, 438, 425.5, 903, 932.2, 340/933; 701/1, 36, 45, 301; 348/118, 348/148
See application file for complete search history.

(56) References Cited

U.S. PATENT DOCUMENTS

| | | | |
|---|---|---|---|
| 2006/0192660 A1* | 8/2006 | Watanabe | B60R 1/00 340/435 |
| 2007/0009137 A1 | 1/2007 | Miyoshi et al. | |

FOREIGN PATENT DOCUMENTS

| | | |
|---|---|---|
| DE | 10 2008 019 461 A | 10/2009 |
| DE | 10 2008 036 009 A1 | 10/2009 |
| DE | 10 2009 005 688 A1 | 7/2010 |
| DE | 10 2009 041 587 A1 | 3/2011 |
| DE | 10 2010 052 304 A1 | 5/2012 |
| EP | 1 182 089 B2 | 2/2002 |
| EP | 1 319 962 B1 | 1/2007 |
| EP | 1 785 326 B1 | 4/2012 |
| WO | WO 2010/089609 A1 | 8/2010 |

OTHER PUBLICATIONS

Written Opinion (PCT/ISA/237) dated Jan. 7, 2013 (Twelve (12) pages).
International Search Report dated Jan. 7, 2013 with English translation (Six (6) pages).
German Search Report dated Jun. 22, 2012 with Statement of Relevancy (Five (5) pages).

* cited by examiner

METHOD FOR THE COMPUTER-ASSISTED PROCESSING OF THE VICINITY OF A VEHICLE

CROSS REFERENCE TO RELATED APPLICATIONS

This application is a continuation of PCT International Application No. PCT/EP2012/068723, filed Sep. 24, 2012, which claims priority under 35 U.S.C. §119 from German Patent Application No. 10 2011 083 770.1, filed Sep. 29, 2011, the entire disclosures of which are herein expressly incorporated by reference.

BACKGROUND AND SUMMARY OF THE INVENTION

The invention relates to a method and a device for computer-assisted processing of the vicinity of a vehicle.

Methods for computer-assisted processing of the vicinity of a vehicle provide information for the driver. In such methods, a plurality of images of roadway sections of the vehicle surroundings are provided on a display unit. In particular, these images are intended to support the driver of a vehicle during a steering or parking process.

Such methods are used as parking aids and parking distance controls. They include at least one distance warning to the rear and optionally to the front. In addition, an audio warning typically informs the driver of the distance to the obstacle. For instance, the repeat frequency of the acoustic signal increases as the distance decreases. The parking aid does not sound until a pre-specified distance between an obstacle and the vehicle has been reached. If the distance between the obstacle and the vehicle drops below a minimum distance, the acoustic warning is typically a continuous tone. Such methods are frequently based on a number of ultrasonic sensors in the front and rear bumpers. Parking aids based on radar are likewise known.

In addition to acoustic information, such systems show the driver of a vehicle a distance map of the immediate surroundings. If the distance to the obstacle drops below a certain threshold, the driver is alerted with different colors on the shrinking distance. Depending on the speed of the vehicle, the driver may decide whether and how far he will continue to drive, brake the vehicle, or turn. The information provided for display is based exclusively on distance information between one or a plurality of obstacles and the vehicle.

An acoustic and/or visual warning may also occur when the vehicle for instance correctly drives by/steers around an obstacle without any actual collision danger if the distance is within the system detection range. Even objects, such as pedestrians who are inside the detection range moving transverse to the vehicle's direction of travel or who are moving away from the vehicle, generate a distance warning even though there is no danger.

It is an object of the invention to provide a method for computer-assisted processing of the vicinity of a vehicle that provides an improved output of warnings. It is further an object of the invention to provide a computer program product and a device for computer-assisted processing of the vicinity of a vehicle.

These objects are attained using a method in accordance with the features of independent claims. The dependent claims provide advantageous embodiments.

In the inventive method for computer-supported processing of the vicinity of a vehicle, the surroundings of the vehicle are detected by and surroundings data are provided by a sensor system. The surroundings data provided by the sensor system are processed by a computing unit in that, for pre-specified sections of the surroundings of the vehicle, a specific distance to objects that are or were detected by the sensor system in the surroundings of the vehicle is ascertained. A collision probability between one of the ascertained objects and the vehicle is ascertained for at least one of the pre-specified sections of the surroundings depending on a predicted and/or actual vehicle movement determined by processing odometric data. The surroundings of the vehicle are depicted or output on an output unit in that, for at least one of the pre-specified sections of the surroundings, distance information between such section(s) of the surroundings and one or a plurality of objects is output using a graphic and/or acoustic element, the element also including collision information about the collision probability for this object.

Odometric data shall be construed to mean all movement parameters for the vehicle. This may include, in particular, a steering wheel or wheel position, the current speed or acceleration of the vehicle or the speed or acceleration of the vehicle automatically required by the driver or other devices, and effective torque on at least one wheel of the vehicle. The transmission ratio of an automatic transmission or of a system for power-assisted steering may also be included in the odometric data. These parameters are variable in modern systems and some may be continuously variable. Particularly advantageous is the use of odometric data predicted for the near future, such as a wheel position and individual wheel speeds that may occur in, e.g. 0.5, 1, 2, 3, 5, 10 seconds. These may be determined from formulas, empirical values, by using simulation techniques, and/or by using the probability theory.

When the present description discusses an object, this shall be understood to include individual components of an object as well.

With the inventive method, it is possible not only to take into account the distance to obstacles, but also to acoustically and/or visually output the collision danger that proceeds from these obstacles. This can, on the one hand, prevent unnecessary warnings, while on the other hand, the driver of a vehicle can concentrate on the areas of the surroundings that actually involve a collision danger. The acoustic and/or visual information about a collision danger may be output as a function of the essentially current or future position of an obstacle relative to the (stationary or moving) vehicle from which this collision danger proceeds. This facilitates, for instance, detection of a situation in which the ascertained distance to an object would not lead to a warning in a conventional system, while the invention considers this object, e.g. due to its movement, as suitable for a potential collision that would be unavoidable or difficult to avoid without warning. Likewise, the method takes into account situations in which a potential collision is "down played" in conventional systems by a warning that is too weak, but which may in principle play a critical safety role for the driver of the vehicle because of a potential collision danger. On the other hand, the inventive method does not generate any distracting or disturbing warnings when an object inside the detection range of the sensor system is moving relatively transverse to the vehicle or laterally alongside the vehicle without endangering it.

In one or more embodiments, the distance information represents the distance between at least one part of the object and at least one part of the vehicle. The collision information additionally includes local coloring in and/or a pre-specified texture on a graphic or on the graphic element. A graphic may include a plurality of graphic elements. The distance information and the collision information for a specific section of the surroundings are output in the same graphic and/or acoustic element. For instance, identical distance information may have been ascertained and output in two different driving situations. Due to the different collision probabilities for the two driving situation, individual graphic and/or acoustic elements may differ in their collision information by virtue of the local coloring in and/or the pre-specified texture of the graphic or the graphic element.

For instance, the graphic element may be embodied in the shape of a strip or a wide line that comprises one or a plurality of connected segments whose color may change in the segments or as color gradients along the strip or line. Different colors represent different collision probabilities. The succession of colors may vary, for instance from black to white to gray to green to yellow to red. In principle, the colors that are ultimately used for visualizing the collision probability or for representing collision information may be selected freely. Likewise, the number of different colors used may be selected freely. In systems used in the past, for instance, three colors have been used (red for a minimum distance to the obstacle, yellow for a moderate distance, and green for a great distance). This succession of colors that is known to the drivers of vehicles could be retained or could optionally be supplemented with additional colors or shades.

In one or more embodiments, the represented distance between a graphic element and parts, especially sections of the surroundings, of the vehicle is embodied as a function of the collision probability between the objects and the parts of the vehicle.

In other words, a graphic element approaches the representation of the vehicle in comparison to a correctly scaled representation of the surroundings disproportionately rapidly if there is a high collision danger between the corresponding object and the vehicle. Conversely, it approaches the vehicle disproportionately slowly, or not at all, when the actual object is being approached compared to a correctly scaled representation of the surroundings if there is only a slight collision danger or no collision danger at all. Thus, the existing or growing collision danger from a specific direction is indicated especially clearly to the user by corresponding elements approaching one another. Such graphic elements may be combined with a correctly scaled representation of the distance using other graphic elements that may be embodied as parts of the same graphic.

In one or more embodiments, the collision information for the at least one object and/or the distance information for this object are output using one or a plurality of acoustic sources produced in the vehicle, wherein a virtual direction of the acoustic source that may be perceived by the user corresponds to the direction from which a collision probability with an object exceeds a pre-specified value and volume from this direction that is audible to the user is changed as a function of the extent of the collision probability between the vehicle and the object or objects. A perceivable direction of the acoustic source may be attained by means of adapting the phases of at least two tones generated by the vehicle acoustic system. This makes it possible to impart to the vehicle occupant or driver location-specific acoustic information about an imminent collision danger. The acoustic warning may be used in conjunction with a visual warning, but may also be used alone.

Further, it is possible to generate, for at least one vehicle occupant, an acoustically perceivable virtual obstruction map that contains at least two or more different acoustic representations that are represented at the same time. In contrast to parking distance controls, in which the only differentiation of acoustic tones is between obstacles to the front and to the rear, numerous acoustic objects positioned clearly in the space with a perceivable angle and distance are generated by means of the phase shift, similar to a Dolby surround-sound speaker system. This improves the amount of detail conveyed with the warning.

In one or more embodiments, the virtual acoustic sources suggest via their perceivable position in space to a vehicle occupant the parts of the vehicle surface that have a greater collision probability than one or a plurality of pre-specified values. Thus the section of the surroundings of the vehicle that is subject to an imminent collision is signaled to the vehicle occupant, in particular the driver of the vehicle, using purely acoustic information. The pre-specified values may have been ascertained empirically or mathematically and stored in a data base. The corresponding values may be ascertained separately for each section of the surroundings and stored individually. The ascertainment of the collision probabilities may relate to certain locations on the vehicle surface, i.e., it is not just the extent of the imminent danger, but also the location on the surface of the car that could be affected by this collision danger that is ascertained and represented. Moreover, when the collision information is being ascertained, the pertinent locations on the vehicle surface are also ascertained. Thus, for the user there is a comprehensible context between the collision dangers and certain parts of the vehicle that could be affected by a collision.

In one or more embodiments, the collision information is represented as a function of the current and/or predicted future position of the object from which a collision danger proceeds relative to the vehicle. This makes it simple for a vehicle occupant, especially the driver, to be able to ascertain intuitively the region of the vehicle threatened.

In accordance with one or more embodiments, the surroundings of the vehicle are represented with respect to a spatial segment as a function of an automatically detected measure for the driver's attention to this spatial segment. If the vehicle is driving backwards, for instance, and the driver is observing the rear portion of the vehicle, either directly, via a minor, or via another display device, this observation by the driver is detected and distance and collision information of this automatically detected region is output and includes the collision danger and the distance. This supports the driver with respect to imminent dangers during a backward, actual vehicle movement.

It is useful when the surroundings data are detected for a range of a maximum of 10 m from the vehicle, in particular 5 m, most preferred 2 m. Because of this, the method is suitable not only as a parking distance control for parking processes or vehicle movement in narrow spaces, but may also be used for instance for an expanded range, for instance when entering intersections, when exiting a driveway, and the like.

It is furthermore useful when the surroundings data are detected for one or two areas around the vehicle, each of which forms a geometrically cohesive area and the shape of which essentially follows the vehicle contour at the relevant locations. This improves the detection of the relative movement of the object/obstacle with respect to the vehicle. Above all, the user of the vehicle obtains a map that is easy to interpret and at the same time comprehensive and that simultaneously is broken down by distance, angle, and respective collision probability, and at the same time includes only a relatively small number of graphics and may nevertheless be understood without specialized knowledge. Thus, there is an advantage over possible far field systems, such as a refinement of an ACC (automatic cruise control) system that may also vary its warnings as a function of collision probability.

It is furthermore useful when the surroundings data are detected for vehicle speeds of at most 25 km/h, in particular 15 km/h, most preferred 7 km/h. In addition to parking the vehicle in a parking space or slowly driving through narrow areas, this speed range also includes speeds at which the vehicle is moved for instance into an intersection and the like.

It is furthermore useful when the distance information and the collision information are graphically represented on a mobile unit that is disposed outside of the vehicle and in particular may control the vehicle remotely. Thus, the collision probabilities around the vehicle may also be monitored and controlled when the vehicle is controlled remotely, especially during a parking process, or when a steering or parking process is executed at least semi-automatically. The user may thus detect not just the presence of objects (such as with a possible representation of a distance map on a mobile unit), but may also detect the extent of the collision probability proceeding from these objects, in particular with respect to the position relative to the vehicle.

It is furthermore useful when the graphic and/or acoustic representation also includes at least one automatically ascertained, suggested maneuver or combination of maneuvers. This maneuver may in particular include a braking process, a swerving maneuver, a gear shift, etc. A combination of maneuvers may be represented as a sequence of maneuvers that may be represented in the form of instructions or in the form of the result to be attained by this maneuver. A swerving maneuver may be represented as a recommended trajectory, steering direction, and/or steering intensity. These may also include maneuvers automatically introduced by the vehicle immediately or after a user acknowledgement.

A maneuver may be automatically ascertained in that the maneuver or combination of maneuvers is ascertained automatically with an overall relatively low collision probability and one or a plurality of maneuvers may be selected and represented according to pre-determined criteria.

A specific warning noise, in particular a noise that is perceived by the user to be approaching, may be an acoustic representation of a recommended or automatically introduced braking process. The approach may be represented as a perceived change in the acoustic element and/or a change in its frequency portions and/or a change in its intensity.

In particular, an acoustic element moving in space in the corresponding direction may be represented as an acoustic representation of a recommended or automatically introduced steering process. In addition, either the position of a corresponding acoustic element that is perceivable for the user and that is realized using the change in the phase shift may be changed, or new acoustic elements may be generated one after the other in different perceivable positions so that the user, in particular the occupant of the vehicle, perceives a type of left or right rotation of the acoustic element or its position. The left or right rotation may also include a specific steering angle and/or the urgency with which the maneuver should be performed.

The invention also includes a computer program product that may be loaded directly into the internal memory of a digital computer and that includes software code segments with which the steps of the method described above may be executed when the product runs on the computer. "Computer" shall be construed in particular to be one or a plurality of control devices that interact with one another and that are needed with the corresponding sensor means for detecting the distance information and for calculating the collision probability.

The invention furthermore includes a device for computer-supported processing of the vicinity of a vehicle. The device includes a sensor system for detecting the surroundings of the vehicle and surroundings data. A computer unit is provided for processing the surroundings data provided by the sensor system, wherein the computer unit is embodied for ascertaining for pre-specified sections of the surroundings of the vehicle a specific distance to objects that are or were detected in the surroundings of the vehicle by the sensor system. The computer unit is further embodied for ascertaining, depending on a predicted and/or actual vehicle movement determined by processing odometric data, for at least one of the pre-specified sections of the surroundings, a collision probability between one of the ascertained objects and the vehicle. An output unit is provided for representing or outputting the surroundings of the vehicle, wherein the output unit is embodied for outputting at least one of the pre-specified sections of the surroundings distance information between this section of the surroundings and one or a plurality of the objects using a graphics and/or acoustic element, wherein the element also includes collision information about the collision probability.

The inventive device has the same advantages that were described in the foregoing in connection with the inventive method.

The invention shall be described in greater detail in the following using exemplary embodiments in the drawing.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
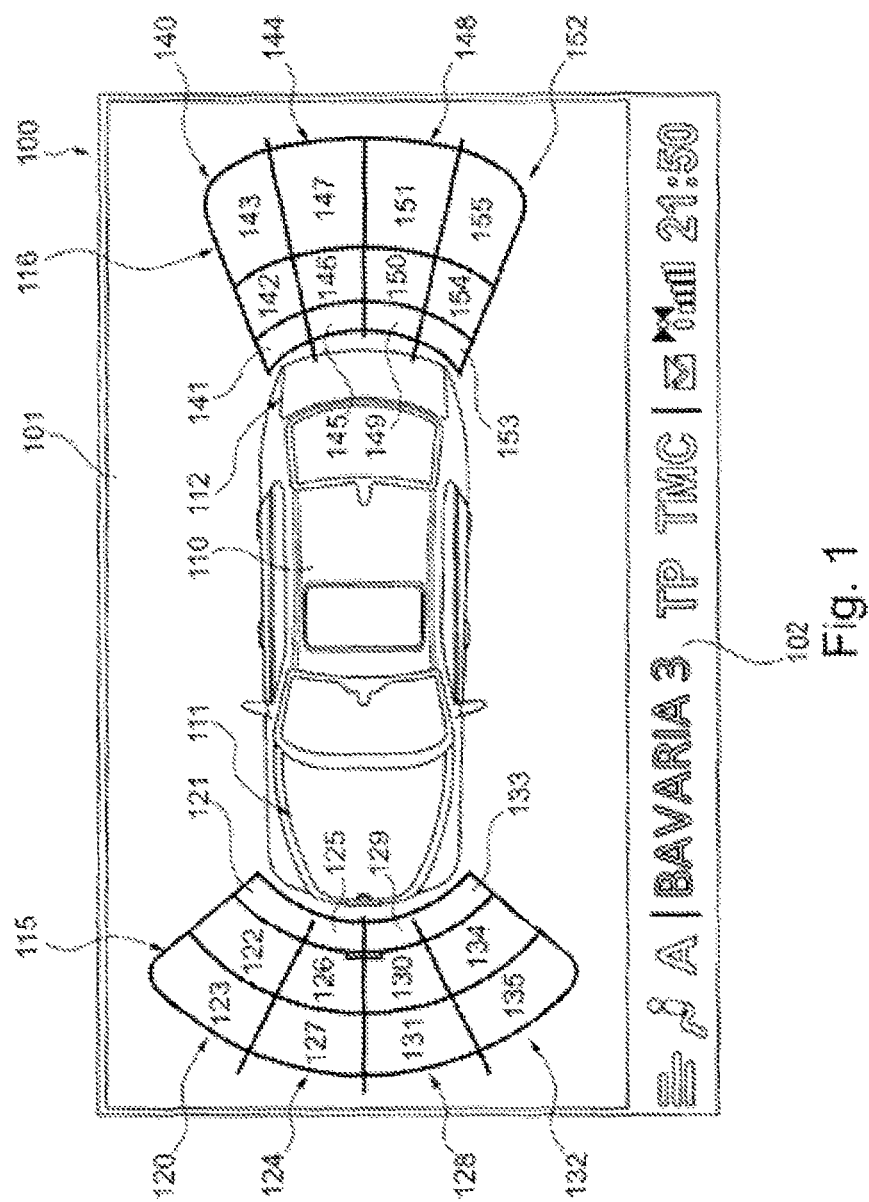
FIG. 1 depicts a vehicle represented in a display device and graphic elements for the information of the user, in particular an occupant of the vehicle, regarding objects that are potentially hazardous for the vehicle.

FIG. 1 illustrates a representation of a vehicle 110 represented in a bird's eye view in a display device 100 that is arranged in particular in a vehicle. The display device 100 is any desired device with which images may be represented visually. In particular this may be embodied as a flat-screen display, a heads-up display, a 3D display, or a projection device. In one preferred variant, the display device is a central vehicle display. The term vehicle shall be construed in particular to mean a motor vehicle. In principle the term vehicle could also refer to a motorcycle, aircraft, watercraft, or the like.

Merely as an example, the screen of the display device 100 depicted in FIG. 1 is divided into an information area 101 in which the vehicle 110, already mentioned, is displayed, and a status area 102. The status area 102 is merely optional and in the present exemplary embodiment displays different other currently selected functions of the vehicle. These may be for instance the climate parameters that are set, information on current entertainment sources, such as e.g. radio station, CD, title, etc., certain traffic information, messages received via a communications transmitter, the receiving field strength of the communications transmitter to a transmitter disposed outside of the vehicle, the time, etc. The information included in the status area 102 is merely of passing interest for the present invention and its description.

The vehicle represented in the information area 101 should help the driver of the vehicle in particular to visualize objects disposed in the surroundings of the vehicle, with which objects the vehicle could collide and thus to warn the driver prior to collisions. To this end, graphic elements 115, 116 are represented in the information area 101 of the display device 100 for a front part 111 of the vehicle 110 and a rear part 112 of the vehicle 110.

The graphic elements 115, 116 are generated based on information that was detected using a sensor system that detects the surroundings of the vehicle, in this instance, in the front part and in the rear part of the vehicle. For instance, the sensor system may have a number of ultrasound sensors that are distributed across the front bumper and rear bumper. Likewise, the sensor system may be camera-based. For instance, one or a plurality of cameras could be provided in the area of the front bumper and in the area of the rear bumper for detecting the surroundings. In principle, the cameras could be arranged at desired locations in the vehicle as long as this permits monitoring of a section of the surroundings of the vehicle that is to be monitored.

The surroundings data provided by the sensor system are processed using a computer unit, not depicted in the figure, for instance one or a plurality of control devices for the vehicle. To this end, for pre-specified sections of the surroundings of the vehicle in particular a distance is ascertained to specific objects that are or were detected in the surroundings of the vehicle by the sensor system.

In the exemplary embodiment in accordance with FIG. 1, the front bumper is divided into four sections of the surroundings that are based for instance on four sensor detection areas 120, 124, 128, 132. In like manner, the rear part 112 of the vehicle is also divided into four sections of the surroundings, these also resulting for example from four sensor detection areas 140, 144, 148, 152. Three distance fields 121 through 123, 125 through 127, 129 through 131, 133 through 135, 141 through 143, 145 through 147, 149 through 151, 153 through 155 are depicted in the display device 100 for each of the sensor detection areas 120, 124, 128, 132 and 140, 144, 148, 152. The closer a distance field is to the front or rear part 111, 112 of the vehicle 110, the shorter the distance is thereto.

Such a representation is known for instance from parking distance controls, wherein the distance fields are colored in with different colors, depending on criticality, as a function of the distance from an object in that sensor detection area. For instance, if the sensor system detects an object from the outer right sensor detection area in the direction of travel 120, first the distance field 123 is colored in. This signals the driver for instance that the object is disposed at a distance from the vehicle that is greater than a pre-specified limit, for instance greater than 1.50 m. If the vehicle's own movement causes it to approach the object or if the object moves toward the vehicle, the distance becomes smaller, so that then the distance field 122 is colored in. The distance field 122 may be colored in yellow, for instance, corresponding to the colors of a stoplight. This signals the driver that the object is disposed for instance in an area between 0.5 and 1.5 m from the vehicle. If this distance drops further, the distance field 121 is colored for instance red to signal to the driver a danger proceeding from the or to the object. The distance fields may be completely or partly colored in.

In contrast to this known approach, using the inventive process it is not the magnitude of the distance between an object and the vehicle for a certain surroundings area of the vehicle that is visualized. Rather, in addition, a collision probability between an ascertained object and the vehicle is ascertained for the pre-specified, monitored, sections of the surroundings depending on a predicted and/or actual vehicle movement determined by processing odometric data. Then, the display device 100 provides a visualization such that the distance information between this section of the surroundings and the object is combined with collision information about the probability of collision with this object for the relevant sections of the surroundings. Thus, there is an advantage in the how well the user may perceive the graphic. The user may thus with one glimpse of the representation ascertain both the geometric aspects of the constellation of objects in the surroundings of the vehicle and the potential danger proceeding from these objects, in particular continuously or in a plurality of increments, with the same graphic and/or acoustic elements. Since rapid detection of the situation is often critical for avoiding accidents when operating a vehicle, besides the additional comfort and confidence, there is also added safety for the vehicle occupants and for the objects in the surroundings.

In a conventional parking distance control, given a stationary vehicle and active (distance) sensor system, for instance the movement of a pedestrian transverse to the front part of the vehicle leads to the distance fields being activated. Depending on the distance at which from the pedestrian moves transverse to the front part of the vehicle, the first distance fields 121, 125, 129, 133 may also indicate a warning although no danger threatens for either the pedestrian or the vehicle. The inventive method recognizes that an object, in this example a pedestrian, is moving transverse to the vehicle, so that there is no danger of a collision in this case. This leads to a corresponding visualization of the drop below the distance in one of the distance fields being suppressed or being provided in a form that signals to the driver of the vehicle merely the presence of an object, but no danger that proceeds therefrom.

To realize this, not only is the distance between the object and the vehicle ascertained, but also the movement of the vehicle itself and/or any movement of the object is detected using technical measurements and taken into account. When this description discusses a movement, this shall be construed as the detection of the direction and the speed of the movement.

In addition or alternatively to the visual information for the driver of the vehicle, there may be acoustic information. For instance, the collision information to an object and/or the distance information to this object may be output using one or a plurality of acoustic sources produced in the vehicle, wherein a virtual direction of the acoustic source that is perceivable for the user corresponds to the direction from which a collision probability with the object exceeds a pre-specified value and a volume from this direction that is audible to the driver is changed as a function of the extent of the probability of a collision between the vehicle and the object. For this it is merely necessary that, similar to a Dolby Surround Sound system, a plurality of speakers is provided in the vehicle in the front and rear areas of the vehicle so that virtual acoustic sources may be produced. A perceivable direction of the acoustic source may be attained by means of adapting the phases of at least two tones generated by the vehicle acoustic system.

In particular, it may also be provided that an acoustically perceivable virtual obstacle map is produced for the vehicle occupants, which obstacle map includes at least two different acoustic representations that are represented at the same time. In this case, as well, many acoustic objects positioned clearly in space may be produced with perceivable angles and distance by means of phase shifting, as for Dolby Surround. In contrast to the tones generated by parking distance controls, in the present invention a warning proceeds from the section of the surroundings of the vehicle in which there is a probability of a collision between the vehicle and the other object. As explained, acoustic and visual representations may be combined with one another in the vehicle. Since selectively critical areas are emphasized or acoustically emphasized, the amount of interpretation a vehicle driver must undertake regarding hazardous objects is reduced.

Due to their perceivable position in space, the virtual acoustic sources indicate to the driver of the vehicle parts of the vehicle surface that have a collision probability that is greater than one or a plurality of pre-specified values.

The collision information may be calculated for different points, e.g., different sections of the surroundings, in that a plurality of temporal measured values from the sensor system may be processed. A linear interpolation of the collision points may result. Likewise, it is possible to conduct a spline interpretation of the collision points. In particular a temporal consideration of the measured values is performed, for instance for the last five measured values. This provides a measured value curve from which a collision probability, and thus the collision information for a certain section of the surroundings of the vehicle, may be ascertained.

Figure 2:
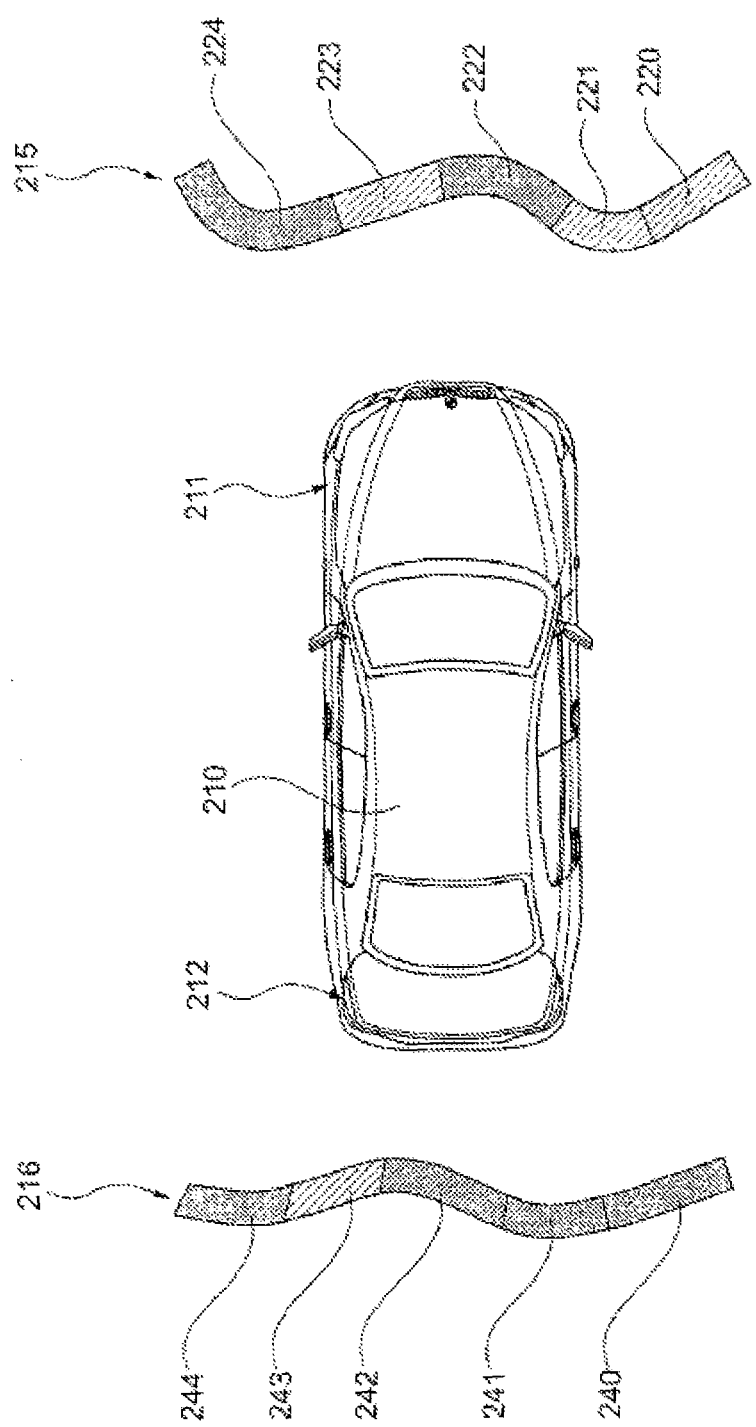
FIG. 2 depicts another representation for the information of the user, in particular the occupant of a vehicle.

FIG. 2 depicts an example of how combined distance and collision information may be visualized on a described display device (as in FIG. 1). In accordance with this embodiment, the graphic elements 215, 216 are configured in the shape of a strip or a wide line. Each graphic element comprises, as an example, five connected segments 220 through 224 and 240 through 244. The color of the segments may change along the strip or the wide line as a function of collision and distance information ascertained. For instance, there is an elevated collision danger for a section of the surroundings to which the segment 221, which is disposed in front and to the right of the vehicle 210, is allocated. This may be signaled for instance by a warning color, for example red. On the other hand, a distance of the line that is becoming shorter in the area of the relevant segment provides additional visual information that there is a collision danger from this area. The collision danger may be due to a movement of the vehicle itself, or it may be due to a movement by the object associated with the segment 221.

The color of the individual segments 220 through 224 and 240 through 244 should be selected such that the driver of the vehicle intuitively perceives a collision that threatens him. Following a color scheme known to the driver, red could mean an immediate danger, yellow a threatened danger, and green no danger. It is possible to provide color transitions between the individual colors and/or the adjacent segments 220 through 224, or 240 through 244. In contrast to a known parking system, already mentioned, it is possible for the graphic elements that are disposed closer to the vehicle to have a smaller warning level than graphic elements that are disposed farther from the vehicle, depending on the direction from which and at what distance there is a true collision danger.

Moreover, other colors may also be provided, such as black, white, and gray, that permit further gradation of danger signaling. In principle, there are no limits on the number of colors to be used, the information content attached an individual color, or any color transitions. The texture of the strip or line may also be varied for visualizing the collision information.

Figure 3:
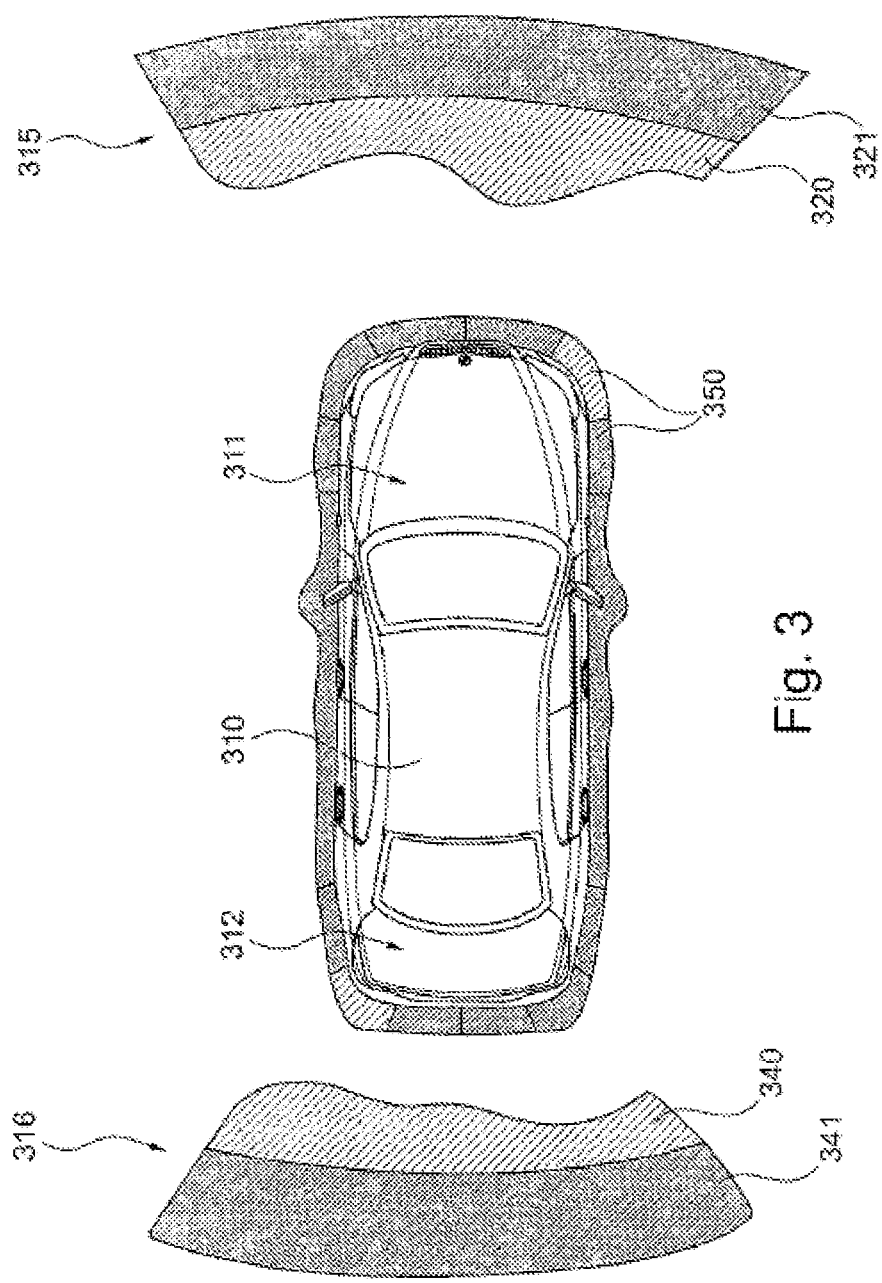
FIG. 3 depicts an alternative representation for the information of the user, in particular an occupant of a vehicle.

FIG. 3 illustrates an example in which the front and rear parts 311, 312 of the vehicle 310 may again be seen from a bird's eye view in a display device (not depicted in greater detail). In addition to the graphic elements 315, 316 already described, which are again merely allocated as an example to the front and rear parts 311, 312 of the vehicle 310, also depicted in this exemplary embodiment are sections of the surroundings 350 that are arranged around the vehicle. While the sections of the surroundings 350 in the front and rear parts 311, 312 of the vehicle 310 are embodied approximately the same size, only a single section of the surroundings extends along each side of the vehicle. This illustration is merely an example. In principle, the number of sections of the surroundings may be divided as desired and arranged along the perimeter of the vehicle. The number and size of the sections of the surroundings essentially depends on the sensor system provided in a vehicle and thus on the possibility of breaking down individual sections of the surroundings.

With this representation illustrated in FIG. 3, a representation of a park assist system that is known to the driver may be combined with a representation that is associated with the vehicle and that directly signals a danger for a specific section of the surroundings. The color scheme described in the foregoing may be used, i.e., a particularly endangered section of the surroundings 350 is for instance emphasized in red compared to the other sections of the surroundings. The color and texture of the sections of the surroundings 350 for signaling collision information may simultaneously be combined with corresponding coloring or distance information in one of the graphic elements 315, 316. For instance, the distance information, possibly with additional color information for signaling a drop below certain distances, is illustrated in a known manner using the graphic element 315. The collision information is depicted in the sections of the surroundings that are allocated to the vehicle.

Figure 4:
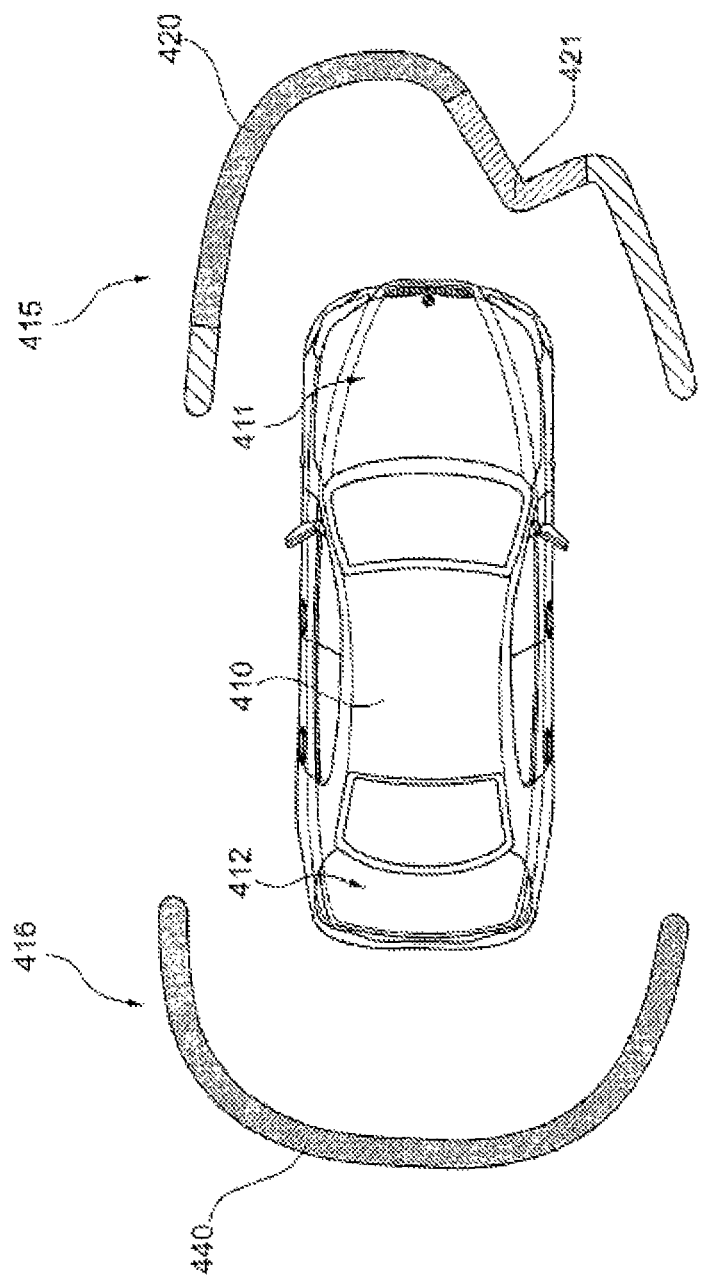
FIG. 4 depicts another, alternative representation for the information of a user, in particular an occupant of a vehicle, regarding a potential hazardous object.

FIG. 4 depicts an example in which the graphic elements 415, 416 are embodied in the configuration of U-shaped strips or lines around the front and rear parts 411, 412 of the vehicle 410. If there is no drop below the distance threshold and at the same time there is no collision probability, the graphic elements 415, 416 are embodied in the configuration strips that approximate the curve of the vehicle. In the exemplary embodiment in FIG. 4, there is a collision danger for the right front bumper. This causes the front graphic element 415 to change its configuration such that an inward constriction 421, possibly combined with corresponding color information or a corresponding change in the texture of the strip, indicates a decreasing distance and simultaneous collision danger.

The inventively suggested driver information that may be provided visually and/or acoustically is provided depending on the actual and/or predicted future position of the vehicle and/or of an object from which a collision risk for the vehicle proceeds.

In another modification of the described exemplary embodiments, the generated representation may possibly be supplemented with one or a plurality of warnings that include the identification of a possible collision site between one or a plurality of parts of the vehicle, especially doors and/or hatches of the vehicle, and one or a plurality of objects in the surroundings of the vehicle. The warnings may be embodied as a graphic, especially spatial symbol. A warning may be integrated into the representation such that the spatial relationship between the object from which the danger proceeds and the potentially endangered location on the vehicle is visualized. A warning may be depicted for instance at a location between an obstacle and the potentially endangered vehicle area, e.g. a vehicle door or at the site of potential damage that may occur if the door is not opened with care.

It may furthermore be provided that the surroundings of the vehicle are depicted with respect to a spatial segment depending on an automatically detected measure of the driver's attention to this spatial segment. This means for instance the direction in which the driver of the vehicle is looking is detected. The computer unit of the vehicle interprets this such that the section(s) of the surroundings of the vehicle disposed in the direction of view is or are in the special focus of the driver. Thus, relevant information regarding a collision risk is output to the driver for this or these sections of the surroundings.

The described combined distance and collision information may be used advantageously for more than parking and steering processes. It is likewise possible to use distance information and correlated collision information in the vicinity of the vehicle in a range of up to 10 m. The method is preferably used for distances of less than 5 m, most preferably less than 2 m. Which distances may be processed essentially depends on the sensor system employed in the vehicle.

Likewise, the sensor system determines up to which speeds the inventive system may reasonably be employed. It is useful when the surroundings data are detected for vehicle speeds of at most 25 km/h. In particular speeds of at most 15 km/h and preferably 7 km/h are detected in order to be able to provide the best possible support to the driver, especially during the aforesaid parking and steering processes.

The display device described in connection with FIG. 1 does not necessarily have to be a fixed component of the vehicle. The display device may likewise be a mobile unit that is disposed outside of the vehicle and may be used for controlling the vehicle remotely.

The invention thus creates intelligent acoustic and/or visual information for occupants of a vehicle without superfluous warnings when outputting information in the vicinity of the vehicle. Moreover, it enables representation and/or acoustic output of the criticality of a steering maneuver in a form that is easily understood for the vehicle.

The improved method for representing the vicinity of the vehicle is based, not only on representing the distance to obstacles, but in addition on representing the collision danger proceeding therefrom and breaking them down spatially. By locally coloring in and/or changing the texture of a graphic or a graphic element that visualizes the distance between vehicle and obstacle, it is also possible to produce a collision probability between the vehicle and the obstacle. The collision danger is represented depending on the essentially actual or future position of the obstacle from which the collision risk proceeds. It may likewise be provided that the representation of the collision danger is given depending on the section of the surroundings of the vehicle that may be affected by the collision Likewise possible is a representation depending on a spatial part in which the collision threatens to take place.

Moreover, it is also possible to provide the representation of the collision danger additionally with a temporal breakdown. In this embodiment of the invention, possible collisions are additionally represented differently according to their predicted time, e.g., collisions that threaten to occur in 0.5 sec are identified by means of a type of graphic element that is provided (e.g., with one type of texture), while the collisions that may occur within a period of time, e.g. in 1 sec, 2 sec, 3 sec, 5 sec, are identified with another type of graphic elements (e.g. with another type of texture). Such a differentiation helps the user to understand which of the potential collisions require the most urgent or less urgent countermeasures. Thus, the user may differentiate the importance of individual messages according to "urgent" and "important" such that the user may see that another collision could indeed take place at a later time, but with a relatively high probability, and could undertake measures like steering, braking, etc., accordingly. In a complex steering environment, there is frequently a plurality of maneuvers or combinations of maneuvers such as changing the direction of travel, rapidly swerving and steering back, or braking. Drivers often find it difficult to select the best possible maneuver or a best possible combination of maneuvers. The representation of the temporal break-down using different graphics is very helpful especially in such situations.

An inventive distinction of the collision dangers in the graphic and/or acoustic representation by time renders especially effective assistance when maneuvering a vehicle between a great number of moving obstacles, which frequently requires very rapid selection of the maneuvers and complex combinations of maneuvers. This application increases in importance in the modern urban environment. The inventive method may also enable the realization of at least part of a remotely controlled maneuver in a complex environment that is not possible with just a distance map or can only be realized without adequate product safety.

A collision or collision probability is ascertained by means of methods known per se depending on vehicle odometric data, position and movement data for the obstacle, and taking into account other factors.

REFERENCE LIST

100 Display device
101 Information range
102 Status range
110 Vehicle
111 Front part of vehicle
112 Rear part of vehicle
115 Front graphic element
116 Rear graphic element
120 Right outer sensor detection area in direction of travel
121 First distance field
122 Second distance field
123 Third distance field
124 Right center sensor detection area in direction of travel
125 First distance field
126 Second distance field
127 Third distance field
128 Left center sensor detection area in direction of travel
129 First distance field
130 Second distance field
131 Third distance field
132 Left outer sensor detection area in direction of travel 133 First distance field
134 Second distance field
135 Third distance field
140 Right outer sensor detection area in rear direction
141 First distance field
142 Second distance field
143 Third distance field
144 Right center sensor detection area in rear direction
135 First distance field
146 Second distance field
147 Third distance field
148 Right outer sensor detection area in rear direction
149 First distance field
150 Second distance field
151 Third distance field
152 Left outer sensor detection area in rear direction
153 First distance field
154 Second distance field
155 Third distance field
210 Vehicle
211 Front part of vehicle
212 Rear part of vehicle
215 Front graphic element
216 Rear graphic element
220 Segment
221 Segment
222 Segment
223 Segment
224 Segment
240 Segment
241 Segment
242 Segment
243 Segment
244 Segment
310 Vehicle
311 Front part of vehicle
312 Rear part of vehicle
315 Front graphic element
316 Rear graphic element
320 Distance field
321 Distance field
340 Distance field
341 Distance field
350 Section of the surroundings
410 Vehicle
411 Front part of vehicle
412 Rear part of vehicle
415 Front graphic element
416 Rear graphic element
420 Segment
421 Constriction
440 Segment The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for computer-supported processing of a vicinity of a vehicle, comprising:
    detecting and providing, by a sensor system, surroundings data corresponding to surroundings of the vehicle;
    processing, by a computing unit, the surroundings data provided by the sensor system to ascertain, for at least three pre-specified sections of the surroundings of the vehicle, a distance to one or more objects detected by the sensor system in the surroundings of the vehicle, wherein the at least three pre-specified sections are stored in a memory unit of the vehicle;
    ascertaining a collision probability between a detected object and the vehicle for the at least one of the three pre-specified sections of the surroundings depending on at least one of a predicted and an actual vehicle movement determined using odometric data;
    depicting the surroundings of the vehicle on an output unit wherein, for the at least one of the three pre-specified sections of the surroundings, distance information between at least one of the three pre-specified sections of the surroundings and the detected object is output using a graphic element and an acoustic element having a plurality of warnings that includes collision information about a collision probability for the detected one or more objects.

2. The method in accordance with claim 1, in which the distance information represents a distance between at least one part of the detected object and at least one part of the vehicle and the collision information includes at least one of local coloring in and a pre-specified texture on the graphic element.

3. The method in accordance with claim 1, in which the graphic element is embodied as a strip or a wide line that comprises one or a plurality of connected segments whose color changes in the segments or as color gradients along the strip or line.

4. The method in accordance with claim 2, wherein the represented distance between at least one part of the detected object and at least one part of the vehicle is embodied as a function of the collision probability between the at least one part of the detected object and the at least one part of the vehicle.

5. The method in accordance with claim 1, wherein at least one of the collision information and the distance information is output using one or a plurality of acoustic sources produced in the vehicle, wherein a virtual direction of the one or plurality of acoustic sources perceived by at least one vehicle occupant corresponds to a direction from which the collision probability exceeds a pre-specified value, and a volume from the direction that is audible to the at least one vehicle occupant is changed as a function of an extent of the collision probability between the vehicle and the detected object.

6. The method in accordance with claim 1, further comprising generating an acoustically perceivable virtual obstruction map for the at least one vehicle occupant, wherein the map contains at least two different acoustic representations that are represented at a same time.

7. The method in accordance with claim 5, further comprising generating an acoustically perceivable virtual obstruction map for the at least one vehicle occupant, wherein the map contains at least two different acoustic representations that are represented at a same time.

8. The method in accordance with claim 6, wherein the one or plurality of acoustic sources indicate, via their perceivable position in space, to the at least one vehicle occupant at least one part of the vehicle that has a greater collision probability than one or a plurality of pre-specified values.

9. The method in accordance with claim 7, wherein the one or plurality of acoustic sources indicate, via their perceivable position in space, to the at least one vehicle occupant at least one part of the vehicle that has a greater collision probability than one or a plurality of pre-specified values.

10. The method in accordance with claim 1, wherein the collision information is represented as a function of at least one of a current and predicted future position of the detected object from which a collision danger proceeds relative to the vehicle.

11. The method in accordance with claim 1, wherein the surroundings of the vehicle are represented with respect to a spatial segment as a function of an automatically detected measure of a driver's attention to the spatial segment.

12. The method in accordance with claim 1, wherein surroundings data are detected for a range of a maximum of 10 meters.

13. The method in accordance with claim 1, wherein the surroundings data are detected for one or two areas around the vehicle, each of which forms a geometrically cohesive area having a shape which essentially follows a vehicle contour at corresponding locations.

14. The method in accordance with claim 1, wherein the surroundings data are detected for vehicle speeds of at most 25 km/h.

15. The method in accordance with claim 1, wherein the distance information and the collision information are graphically represented on a mobile unit that is disposed outside of the vehicle, wherein the mobile unit is configured to control the vehicle remotely.

16. The method in accordance with claim 1, wherein at least one of the graphic element and acoustic element includes at least one automatically ascertained, suggested maneuver or combination of maneuvers.

17. A computer program product, comprising:
 a processor executable, non-transitory storage medium having processor executable code stored thereon for processing the vicinity of a vehicles, the processor executable non-transitory storage medium having processor executable program code to perform the method of claim 1.

18. A device for computer-supported processing of the vicinity of a vehicle, comprising:
 a sensor system configured to detect surroundings of the vehicle and to provide surroundings data corresponding to said surroundings;
 a computer unit for processing the surroundings data provided by the sensor system, wherein the computer unit is configured to:
 ascertain, for at least three pre-specified sections of the surroundings of the vehicle, a distance to one or more objects detected by the sensor system in the surroundings of the vehicle, wherein the at least three pre-specified sections are stored in a memory unit of the vehicle;
 ascertain a collision probability between a detected object and the vehicle for at least one of the three pre-specified sections of the surroundings depending on at least one of a predicted and an actual vehicle movement determined using odometric data; and
 an output unit configured to represent the surroundings of the vehicle where, for the at least one of the three pre-specified sections of the surroundings, distance information between at least one of the three pre-specified sections of the surroundings and the detected object is output using a graphic element and an acoustic element having a plurality of warnings that includes collision information about a collision probability for the detected one or more objects.

* * * * *